United States Patent [19]

Bindin

[11] 4,452,871
[45] Jun. 5, 1984

[54] ALKALI METAL CELLS AND BATTERIES AND THE MANUFACTURE THEREOF

[75] Inventor: Peter J. Bindin, Runcorn, England

[73] Assignee: Chloride Silent Power Ltd., London, England

[21] Appl. No.: 387,093

[22] Filed: Jun. 10, 1982

[30] Foreign Application Priority Data

Jun. 15, 1981 [GB] United Kingdom ................ 8118324
Dec. 23, 1981 [GB] United Kingdom ................ 8138858

[51] Int. Cl.³ ............................................. H01M 2/02
[52] U.S. Cl. ...................................... 429/104; 429/181
[58] Field of Search ................................ 429/104, 181

[56] References Cited

U.S. PATENT DOCUMENTS

| | | | |
|---|---|---|---|
| 3,932,195 | 1/1976 | Evans et al. | 429/104 |
| 3,982,959 | 9/1976 | Partridge et al. | 429/104 |
| 4,020,246 | 4/1977 | Seo et al. | 429/104 |
| 4,024,321 | 5/1977 | Tilley | 429/104 |
| 4,038,464 | 7/1977 | Baukal et al. | 429/104 |
| 4,238,553 | 12/1980 | Weddigen et al. | 429/104 |

*Primary Examiner*—Donald L. Walton
*Attorney, Agent, or Firm*—Beveridge, DeGrandi & Kline

[57] ABSTRACT

In a sodium sulphur cell having, within a metal housing, a ceramic electrolyte tube separating the liquid alkali metal from the cathodic reactant, a current collector extends into the region inside the electrolyte tube and is electrically insulated from the electrolyte by an insulating element. The metal housing is sealed to the insulating element in a region around the current collector which region has a maximum cross-section substantially less than the maximum cross-section of the electrolyte tube and preferably lies wholly within the outer periphery of the electrolyte tube. The small seal areas with the constructions described give improved economy and reliability. The constructon has particular advantages with cells of short length.

25 Claims, 4 Drawing Figures

ALKALI METAL CELLS AND BATTERIES AND THE MANUFACTURE THEREOF

BACKGROUND OF THE INVENTION

1. Field of the Invention

This invention relates to cells containing a liquid-alkali metal and to batteries formed of such cells and to the manufacture of such cells and batteries and is particularly applicable to sodium sulphur cells and batteries.

2. Prior Art

The sealing of sodium sulphur cells has been given considerable attention over the years because of the problems in effecting suitable seals. It has long been appreciated that cylindrical cells employing tubular solid electrolyte material has considerable advantages over flat plate cells. In a tubular cell, the construction may be of the central sodium type in which the electrolyte tube separates liquid sodium inside the tube from the sulphur/sodium polysulphides in an annular region between the outside of the electrolyte tube and a casing. In a central sulphur cell, the sulphr/sodium polysulphides lies inside the tube and the sodium is in the annular region between the electrolyte tube and the casing. In either case, a current collector has to extend outwardly from the central region. The electrolyte tube may be formed with one closed end but the other end has to be sealed around the current collector. Furthermore the annular region between the housing and the electrolyte tube must also be sealed. Current practice has been to secure an alpha alumina rigid ring around the open end of the electrolyte tube and to seal to this ring closure elements for closing both the sodium and the sulphur regions of the cell. Various techniques have been proposed and various forms of mechanical construction but these all require relatively large diameter seals between a metallic closure element and the alpha alumina ceramic ring.

SUMMARY OF THE INVENTION

According to one aspect of the present invention, a sodium sulphur cell comprises a metal housing, tubular ceramic electrolyte material within said housing separating a first electrode region within the tubular electrolyte from a second electrode region between the electrolyte and the housing, one of said electrode regions containing sodium and the other containing sulphur/sodium polysulphides, and a current collector extending into the first electrode region but electrically insulated from the electrolyte by an electrically insulating element and wherein the metal housing is sealed to said insulating element in a region around the current collector, which region has a maximum cross section substantially less than the cross section of the electrolyte tube.

The aforesaid region may lie wholly within the outer periphery of the electrolyte tube. The electrolyte tube commonly would be cylindrical and, in this case, conveniently said region around the current collector is an annular region having a maximum diameter substantially less than the diameter of the electrolyte tube. The sealing region may have a diameter less than one half and conveniently less than one quarter the diameter of the electrolyte tube.

In one construction, the cell has a solid electrolyte tube separating a first annular region, between the electrolyte tube and the cell housing, from a second annular region, within the electrolyte tube around a current collector, the electrolyte tube separating liquid sodium in one of the annular regions from the sulphur/sodium polysulphides constituting the cathodic reactant in the other, and a ceramic closure element extends across the end of the electrolyte tube and is joined thereto, at least the part of the ceramic closure through which the current collector extends being of electrically insulating material, and a metal annular closure member is secured around its outer periphery to the housing and around its inner periphery to the non-conducting material of the ceramic closure member around the current collector. The ceramic closure element may be integral with the electrolyte tube or may be a ceramic element sealed to the electrolyte tube.

The invention, from another aspect, includes within its scope a sodium sulphur cell having an outer metal housing containing a cylindrical ceramic electrolyte tube which separates an anodic region containing liquid sodium from a cathodic region containing sulphur/sodium polysulphides, one of said regions, referred to as the inner region, being within the electrolyte tube and the other, referred to as the outer region, being outside the electrolyte tube, wherein one end of the electrolyte tube is closed by a ceramic closure through which passes a metal current collector extending from the inner region through the closure and wherein the housing comprises a tubular metal element having a metal closure member at its open end, which metal closure member is secured around its periphery to said cylindrical metal element and is sealed to said ceramic closure, or to a non-electronically conductive member secured thereto, in an annular region around the current collector which annular region has a maximum diameter substantially less than the diameter of the electrolyte tube.

With this construction, the maximum diameter of the seal between the metal closure element and the ceramic closure can readily be made less than half the diameter of the electrolyte tube and is preferably less than one quarter the diameter of the electrolyte tube. The metal closure may be sealed to the ceramic by a compression seal, conveniently using thermo-compression bonding or a diffusion bond obtained by a cold compression technique such as a taper seal employing a soft metal interlayer.

The electrolyte tube is very conveniently of beta alumina. A ceramic closure element may be in the form of a plate of alpha alumina or of beta alumina which can be sealed by glazing to the open end of the electrolyte tube. If the plate is of beta alumina, the required non-conductive region around the current collector may be formed for example as a bush of alpha alumina. The metal closure element may be sealed by welding around the periphery of the metal housing. The inner periphery of the metal closure element can be secured to the ceramic closure plate or to said bush in a small diameter seal. Such a small diameter seal is not only easier and more economic to effect than a large diameter seal but also can readily be made with a high degree of reliability.

Considered from another aspect, the invention furthermore includes within its scope a liquid alkali metal cell having a cylindrical electrolyte tube separating an inner region within the tube from an annular region between the outside of the tube and a housing, one of said regions containing a liquid alkali metal constituting the anodic material and the other containing the cathodic material of the cell, the open end of the electrolyte tube having an inwardly-extending ceramic flange sealed thereto, said flange having a central aperture through which a current collector extends and a metal closure element of annular form welded around its outer periphery to the housing and bonded around its inner periphery to said flange or to a ceramic element sealed thereto in a region around the current conductor of smaller diameter than the electrolyte tube. Said flange may be integral with the electrolyte tube or may be a ceramic element sealed to the electrolyte tube.

The electrolyte tube may be formed with one integral closed end, the current conductor and seal being formed at the other end of the tube. Alternatively the electrolyte tube may be provided with ceramic closure plates at both ends. Commonly in such a case the current collector would have to extend through the closure plate at one end. The metal housing likewise may be formed as a can with one open end which is sealed as described above.

The sealing techniques described above have particular application to short tubular cells, for example a cell wherein the internal length of the electrolyte element is between three times and 0.33 times the mean internal diameter of that element and preferably is between 1.5 and 0.7 times the mean diameter.

This very short length for a cell compared with its diameter marks a very significant departure from presentday practice and, combined with the small seal construction described above, leads to wholly unexpected advantages. In order to explain these advantages, it is necessary to consider in more detail present-day practice in the construction not only of cells but also batteries. For practical purposes, a sodium sulphur battery must contain a very large number of cells. For a vehicle, one can envisage, using the largest cells at present available, that the battery might be constructed of five strings of cells each string containing 96 cells in series, giving a total of 480 cells. Cross interconnection between the strings is necessary in a sodium sulphur cell since, a cell may become open circuit, for example if it is overdischarged. An open circuit cell in a continuous series string of cells would prevent any power being drawn from the other cells in the string. Thus typically the cross connections between the strings might be made so that each group of four cells in a string is connected in parallel with similar cells in the other strings. In such a battery, if any one cell in a string fails and becomes open circuit, e.g. by becoming over - discharged, no power can be drawn from the other three cells in the group of four cells in that string. Furthermore however if there are five strings and one string becomes open circuit, the parallel string must carry the whole current of the battery and thus, if there are only five strings, then four strings would have to carry the whole battery current and may become overloaded. Thus, despite the use of 480 cells in the example given above, a battery may have to be removed from a vehicle for servicing and replacement of cells even if only a few cells fail. Moreover replacement of individual cells in a sodium sulphur battery raises further problems because of the necessity of phasing the charge and discharge state of the replacement cells with the existing cells in the battery.

Heretofore development of sodium sulphur cells and batteries has proceeded on the basis that, for reasons of cost effectiveness, individual cells should be made as large as possible. Modern developments in technology now enable beta alumina electrolyte tubes for such cells to be fabricated in lengths of many tens of centimetres.

A major part of the expense of a cell arises in the sealing of the cell.

The cell of the present invention, with the small seal and having a relatively small length to diameter ratio (referred to hereinafter as the aspect ratio) compared with typical modern sodium sulphur cells leads to wholly unexpected advantages in economy of construction and in reliability. The maximum current that can be drawn from a sodium sulphur cell depends, inter alia, on the surface area of the electrolyte exposed to the anode and cathode materials. Decreasing the size of a cell reduces this area but increasing the aspect ratio for a given length cell increases the area and hence helps to maintain the maximum current. Even so, the maximum current that can be drawn from such a cell, because of the short length, is very much smaller than from conventional cells, and might typically be of the order of 2 amps as against 60 amps for a conventional cell. Because of this, the central current collector for the electrode within the electrolyte material can be of very much smaller diameter than in a conventional cell. This considerably simplifies the problem of sealing the cell and enables further improvements in construction to be obtained. The central current collector may be a cylindrical rod of relatively small diameter and such a rod can be sealed into a ceramic end closure plate for the cell simply by forcing the rod through a hole in the ceramic. Because of the relatively small diameter of the rod, any changes in dimensions due to thermal expansion become physically very small. The ratio of the collector rod diameter to the electrolyte diameter can be much smaller than in conventional cells due to the smaller current and hence the tolerances which are a percentage of the thermal expansion changes become even smaller.

This construction readily permits of the top and bottom end closures for the electrolyte to be made of electrolyte material, e.g. beta alumina, thereby giving a high effective surface area per unit volume for the cell.

Quite apart from the simplified construction, of which further aspects will be explained later, the above-described cell leads to further very important advantages in reliability. Firstly a short length of beta alumina electrolyte tube has a significantly lower risk of failure compared with a long tube and hence the possibility of failure of the electrolyte is very considerably reduced. At present it is possible to produce electrolyte material which will last for say 800 to 1000 charge/discharge cycles. By utilising very much shorter cells, the probable life of the cell measured in charge and discharge cycles can be very considerably increased. Because the cell is physically smaller than conventional cells, for a given power output or energy storage capacity, many more cells have to be used than with conventional larger cells. If the cell has a maximum current capacity of 2 amps instead of 60 amps, then 30 times as many cells have to be used for a given maximum current capacity. This leads to a battery construction with many more strings in parallel than heretofore. The number of cells in series depends on the voltage required. The cells of the present invention facilitate the possibility of high voltage batteries, e.g. with a voltage of say 1000 volts which would be desirable for many purposes because of the considerably smaller current magnitudes for a given power and hence the reduction of conductor sizes. Inherently however the much larger number of cells in a battery improves the overall reliability of the battery even if the individual cells had the same mean time between failure (MTBF). As explained above, the cells of the present invention have an improved MTBF compared with existing cells and hence utilisation of these cells in a battery gives a very significant improvement in the overall battery life.

In a sodium sulphur battery it is desirable that a failed cell should become open circuit. If a failed cell provides a short circuit, this low impedance exists across all other cells in parallel, if, in the battery, cross connections are utilised to parallel individual cells. If the cross connections connect groups of cells in parallel, a short circuit in one cell leads to extra current through all the other cells of the group.

To ensure that a failed cell becomes open circuit, the central current collector may be formed to constitute a fuse or the cell may be arranged to incorporate a fuse in the leads to one or other of the two current collectors. Because of the relatively low current through an individual cell, for example a maximum of 2 amps and because a large number of cells are connected in parallel, for example 100 cells, if a single cell becomes short circuit, there is a very large current passing through the cell, far in excess of the normal load current. It is thus readily possible to construct a rod-type current collector of a metal which will fuse if the cell becomes short circuited and, as a result, has to carry the load current of parallel cells.

With a sodium sulphur battery having a large number of relatively small cells, as described above, even if a fuse is not provided for each individual cell, a major degree of protection, ensuring that a cell becomes open circuit if it fails, is obtained inherently in that, if a single cell passes excessive current, the sodium in the anodic region is rapidly transferred through the electrolyte sodium ions and conduction ceases when the anodic region is depleted of sodium.

A short cell, as described above, has a further advantage in simplicity of manufacture compared with a long cell in that angular misalignment of a central current collector is much less critical. The current collector may readily therefore be supported only at the end through which it is inserted. At the other end of the cell, a stop may be provided to limit the depth of insertion of the current collector.

The electrolyte material may be formed as a tube with sealed ceramic end members. These end members may be formed of alpha alumina but conveniently they may be formed of conductive electrolyte material such as beta alumina. It is convenient however to form the electrolyte member as a cup-shaped member closed at one end or as a bottle-shaped member, that is to say a tubular member closed at one end and having an inturned flange at the other end. This inturned flange may define the aperture through which the central current collector is inserted. In such a cell, conveniently the sodium is put inside the electrolyte material. The current collector may be a force fit in the inturned flange. The sulphur electrode may be a preformed cylindrical element or a two or more part cylindrical element arranged to fit around the outside of the cylindrical portion of the electrolyte material. The assembly may then be put in an outer case which constitutes the second current collector. Spring means, which may be welded to the outer case, may be provided to bear down on the top plate or top of the electrolyte to hold the internal components in position.

In a central sodium cell, wicking means may be provided on the internal surface of the electrolyte or cylindrical portion of the electrolyte using known techniques. If the wicking is constituted by a metal element, e.g. iron foil to form a capillary region adjacent the surface of the electrolyte, it is convenient, to permit the formation or insertion of the wick, to utilise a ceramic disc across the end of a tube or cup-shaped electrolyte member. This ceramic disc may be of alha alumina or of beta alumina. Such a disc may be secured in position by glazing under vacuum or in an inert atmosphere. If the electrolyte element is a tube sealed by plates at each end, the two ends may be secured by glazing in this way.

In a central sodium cell manufactured as described above, it is convenient to fill the interior of the electrolyte element with sodium through the hole for insertion of the central current collector. Such filling may be effected for example by inserting a filling tube through the hole after the interior has been flushed with an inert gas, the filling tube being of smaller diameter than the hole to allow escape of the gas during the filling process.

Because of the relatively small current capacity of small cells as described above, the cathode structure, which is typically formed of carbon fibres or carbon fibres mixed with other material, the fibres being impregnated with the cathodic reactant, may be utilised to conduct the cathodic current to a conductive region of the outer case. The outer case may for example be formed of aluminum and coated, over a limited region, with a coating resistant to corrosion. Other parts of the case, in contact with the cathodic reactant, will tend to passivate and have a non-conductive layer of sulphide material. Again it will be seen that this leads to a simple manufacturing process well adapted for automatic assembly of cells.

DESCRIPTION OF THE PREFERRED EMBODIMENTS

Figure 1:
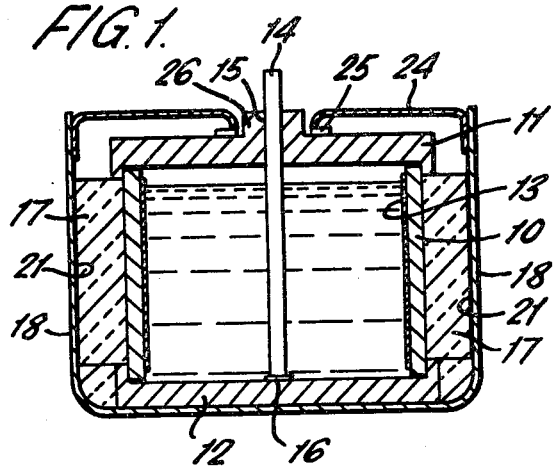
FIGS. 1 and 2 are diagrammatic longitudinal cross-sections through cells forming respectively two embodiments of the invention.

Referring to FIG. 1, a sodium sulphur cell of the central sodium type is illustrated comprising a cylindrical beta alumina electrolyte element 10 having a ratio of length to diameter of about 0.83 is closed at its top and bottom ends by ceramic end plates 11, 12 respectively. These end plates, in this particular example, are formed of alpha alumina but they may be formed of beta alumina. The end plates are sealed, as will be described later, by glazing to the cylindrical element 10. Within the sealed assembly is an iron foil element 13 lying closely adjacent the cylindrical surface of the beta alumina to leave a capillary region adjacent that surface constituting a wick. The interior of the assembly is filled with sodium which is liquid at the operating temperature of the cell. A current collector rod 14 extends into the sodium, this rod being a force fit through a tapered aperture 15 in the top plate 11 and, at its lower end, abutting against a stop 16 on the bottom plate 12. Around the outside of the cylindrical portion of the beta alumina is a cathode structure of annular form constituted by two semi-cylindrical elements 17 of carbon fibre material impregnated with sulphur. These elements lie between the electrolyte 10 and an outer aluminium cup-shaped case 18, the cathode elements 17 being in contact both with the beta alumina and the case. These cathode elements may be formed in the known way be compression of the fibre material which is impregnated with hot sulphur, the sluphur then being cooled so as to be solidified and thereby to hold the elements in compression to facilitate assembly of the cell. When the cell is raised to the operating temperature, typically 350° C., the sulphur melts and the resilience of the fibre material causes the elements 17 to make good contact with the case 18 and the electrolyte 10. Part of the casing 18, on its internal surface, is coated with an anti-corrosive electronically conductive coating 21 to provide an electronically conductive path between the casing and the carbon fibre material.

The assembly is held in position in the casing and the outer annular region is sealed by means of an annular metal top cap 24 which is welded, e.g. by electron beam welding, to the metal housing around the periphery thereof and is sealed to the top plate 11 around the current collector. In the simplest form, the metal member 24 may be a spring member which bears down on a seal ring, e.g. an annular washer 25, around a boss 26 on the top plate 11, as shown in FIG. 1.

Figure 2:
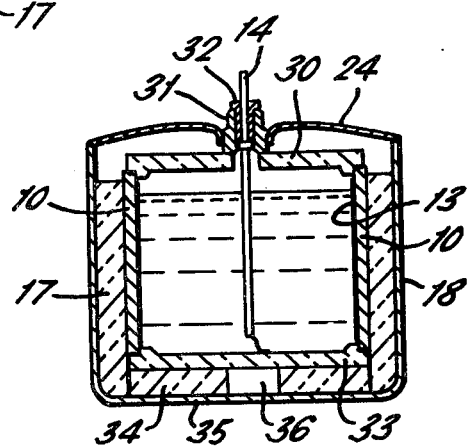

FIG. 2 illustrates a modification of the construction of FIG. 1. In the arrangement of FIG. 2, a top plate 30 of ionically-conductive electrolyte material is used. This has to be electrically insulated from the current collector 14 and an alpha alumina bush 31 is glazed to the closure plate 30. In the construction shown in FIG. 2, the current collector 14 has an expendable rivet termination 32 securing the current collector in the bush 31 forming a hermetic seal between the rivet and the bush and between the rivet and the collector. FIG. 2 also illustrates a construction in which the metal closure element 24, which is welded, e.g. by electron beam welding, to the top end of the casing 18, is secured to the ceramic material by a diffusion bond. In this particular embodiment, the metal element 24 and the bush 31 have co-operating tapered surfaces which are forced together with a thin layer of aluminium between the surfaces to form a compression bond.

In FIG. 2, the electrolyte tube has a bottom closure plate 33 which is also formed of beta alumina and which is sealed by glass to the tube 10. This plate 33 thus constitutes part of the cell electrolyte and, to utilise this, the sulphur electrode includes a disc 34 of impregnated fibre material between the plate 33 and the bottom 35 of the housing. An alpha alumina separator 36 spaces the plate 33 away from the housing.

The central current collector in a cell of the type described may be made as a fuse to ensure that the cell becomes open circuit in the event of a fault causing a large current flow. Other ways of providing a cell with a fuse are possible. Provided the cells become open circuit on failure, large numbers may be connected in parallel.

Figure 3:
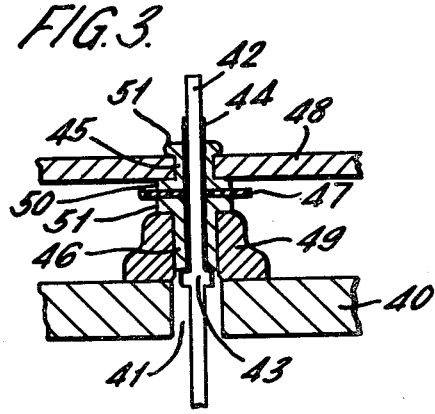
FIGS. 3 and 4 are part sections through further cell constructions illustrating two methods of sealing a current collector in an insulating bush.

FIG. 3 is a longitudinal section through part of a sodium sulphur cell of the general type such as has been described above having a short cylindrical electrolyte tube in an outer metal housing. The electrolyte tube is closed at the top end by an alumina disc 40, conveniently beta alumina in this embodiment. The disc 40 has a central aperture 41 through which passes a steel current collector rod 42 which has an enlarged diameter portion 43. Around the upper part of portion 43 and part of the stem of rod 42 above portion 43 is an electrically insulating coating 44 of resin-bonded fibre glass or of alumina. This coating 44 insulates the current collector from a deformable metal (e.g. aluminium) rivet, which rivet is formed in two parts 45, 46 separated by an insulating washer 47. The part 45 passes through an aperture in a metal closure 48 for the cell while the part 46 enters into a bore in an alpha alumina spigot 49 secured by glazing to the disc 40. The part 46 rests on the enlarged diameter portion 43 of the current collector and thus, using a rivetting tool holding the current collector 42 and pressing on the part 45, the two parts of the rivet can be compressed axially so that they form tight seals on the metal closure 48 and on the alumina spigot 49. the upper part 45 has a flange 50 below the closure 48 and, when compressed, is deformed to have a head 51 above the closure 48. The lower part 46 has a head 52 above the spigot 49 and, when compressed, is deformed to seal tightly against the inside of the spigot.

It will be seen that the rivet with two-part body of FIG. 3 provides a simple and convenient way of effecting hermetic seals simultaneously in the aperture of the closure 48 and to the spigot 49 which is sealed to the alumina closure disc 40.

Figure 4:
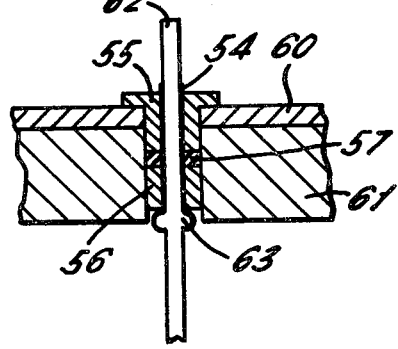

FIG. 4 illustrates a modification of the construction of FIG. 3 suitable for use where the top metal closure 60 of the cell lies immediately adjacent a ceramic closure 61 for the electrolyte tube. In this case, there is no electrode material between the metal 60 and ceramic 61 and thus the ceramic would in general be alpha alumina. The current collector comprises a rod 62 with enlarged diameter portion 63 and has an electrically insulating coating 54 where it passes through the seal assembly. A rivet body is formed of two parts 55, 56 separated by an insulating washer 57. In the construction of FIG. 4, the upper part 55 of the rivet body is cylindrical with a head above the metal closure so that axial compression of the rivet deforms the cylindrical portion outwardly to seal on the metal closure 60 and on the alumina closure 61. The lower part 56 of the rivet deforms radially outwardly to seal the alumina closure 61.

I claim:

1. A sodium sulphur cell comprising a metal housing, tubular ceramic electrolyte material within said housing separating a first electrode region within the tubular electrolyte from a second electrode region between the electrolyte and the housing, one of said electrode regions containing sodium and the other containing carbon fibre material impregnated with sulphur/sodium polysulphides, and a first current collector extending into the first electrode region but electrically insulated from the electrolyte by an electrically insulating element and wherin the metal housing forming a second collector is sealed to said insulating element in a region around said first current collector, which region has a maximum cross section substantially less than the cross section of the electrolyte tube, and wherein the internal length of electrolyte tube is between 1.5 times and 0.7 times the mean internal diameter of that tube.

2. A sodium sulphur cell as claimed in claim 1 wherein said region around the current collector lies wholly within the outer periphery of the electrolyte tube.

3. A sodium sulphur cell as claimed in claim 1 wherein the electrolyte tube is cylindrical and wherein said region around the said first current collector is an annular region having a maximum diameter substantially less than the diameter of the electrolyte tube.

4. A sodium sulphur cell as claimed in claim 1 wherein said metal housing comprises a cylindrical metal container portion having a metal closure member at one end thereof, said metal closure member having an aperture around said first current collector with the peripheral portion of the closure around the aperture sealed to said insulating element.

5. A sodium sulphur cell as claimed in claim 1 wherein said electrically insulating element comprises a sleeve around said first current collector.

6. A sodium sulphur cell as claimed in claim 5 wherein said tubular electrolyte material comprises a cylindrical beta alumina tube with an annular ceramic closure element sealed to the beta alumina tube at one end thereof and sealed to said sleeve.

7. A sodium sulphur cell as claimed in claim 6 wherein said ceramic closure element is formed of alpha alumina.

8. A sodium sulphur cell as claimed in claim 6 wherein said ceramic closure element is formed of beta alumina.

9. A sodium sulphur cell as claimed in claim 1 wherein said tubular electrolyte material comprises a cylindrical beta alumina tube and wherein said electrically insulating element comprises an annular alpha alumina element sealed to the beta alumina tube at one end thereof.

10. A sodium sulphur cell having an outer metal housing containing a cylindrical ceramic electrolyte tube having an internal length between 1.5 times and 0.7 times its means internal diameter and which separates an anodic region containing liquid sodium from a cathodic region containing sulphur/sodium polysulphides, one of said regions, referred to as the inner region, being within the electrolyte tube and the other, referred to as the outer region, being outside the electrolyte tube, a ceramic closure across one end of the electrolyte tube, a metal first current collector extending from the inner region through the closure, said housing constituting a second current collector and comprising a tubular metal element having a metal closure member at its open end, which metal closure member is secured around its periphery to said tubular metal element and is sealed to said ceramic closure, or to a non-electrically coductive member secured thereto, in an annular region around said first current collector which annular region has a maximum diameter substantially less than the diameter of the electrolyte tube.

11. A cell as claimed in claim 10 wherein the ceramic closure element is integral with the electrolyte tube.

12. A cell as claimed in claim 10 wherein the ceramic closure element is sealed to the electrolyte tube.

13. A cell as claimed in claim 10 wherein the maximum diameter of the seal between the metal closure element and the ceramic clousre is less than half the diameter of the electrolyte tube.

14. A cell as claimed in claim 10 wherein the maximum diameter of the seal between the metal closure element and the ceramic closure is less than one quarter the diameter of the electrolyte tube.

15. A cell as claimed in claim 10 wherein the electrolyte tube is of beta alumina and wherein the ceramic closure is a plate of alpha alumina sealed by glazing to the open end of the electrolyte tube.

16. A cell as claimed in claim 10 wherein the electrolyte tube is of beta alumina and the ceramic closure is a plate also of beta alumina with a nonconductive region around the current collector formed of alpha alumina.

17. A cell as claimed in claim 10 and having liquid sodium within the electrolyte tube and having sulphur/sodium polysulphides in the region around the electrolyte tube within the housing and between said ceramic closure and said metal closure member.

18. A cell as claimed in claim 10 wherein the metal closure element is sealed to the housing by welding around the periphery of the metal housing.

19. A cell as claimed in claim 10 wherein said metal current collector is a rod sealed into said ceramic closure by forcing the rod through an aperture in said ceramic closure.

20. A sodium sulphur cell as claimed in claim 10 wherein electrolyte tube has top and bottom ceramic end closures of solid electrolyte material.

21. A cell as claimed in claim 10 wherein said electrolyte tube is a cup-shaped member of beta alumina closed at one end and sealed at the other end by a plate of beta-alumina sealed to the tube.

22. A liquid alkali metal cell having a metal housing, a cylindrical electrolyte tube having an internal length between 1.5 times and 0.7 times its mean internal diameter and separating an inner region within the tube from an annular region between the outside of the tube and said housing, one of said regions containing the anodic material and the other the cathodic material of the cell, said electrolyte tube having an open end with an inwardly-extending ceramic flange sealed thereto, said flange having a central aperture, a first current collector extending through said central aperture and a metal closure element of annular form welded around its outer periphery to the housing and bonded around its inner periphery to said flange or to a ceramic element sealed thereto in a region around said first current collector of smaller diameter than the electrolyte tube, said housing forming a second current collector.

23. A cell as claimed in claim 22 wherein the electrolyte tube has one integral closed end, said first current conductor and seal being formed at the other end of the tube.

24. A cell as claimed in claim 22 wherein the electrolyte tube has ceramic closure plates at both ends.

25. A cell as claimed in claim 22 wherein the liquid alkali metal is sodium and wherein the cathodic reactant is sulphur/sodium polysulphides.

* * * * *